(12) United States Patent
Cuk et al.

(10) Patent No.: US 6,429,662 B1
(45) Date of Patent: Aug. 6, 2002

(54) INTERNAL FAULT INDICATOR FOR POWER ELECTRICAL DEVICES

(75) Inventors: Nikola Cuk, North Vancouver; Stuart H. Hicks, Vancouver; Robert Suggitt, Burnaby, all of (CA)

(73) Assignee: IFD Corporation, Vancouver (CA)

( * ) Notice: Subject to any disclaimer, the term of this patent is extended or adjusted under 35 U.S.C. 154(b) by 113 days.

(21) Appl. No.: 09/593,749

(22) Filed: Jun. 14, 2000

(51) Int. Cl.[7] .......................... G01L 19/14; G01L 7/08
(52) U.S. Cl. ...................................................... 324/547
(58) Field of Search ............................. 324/547, 537, 324/536; 361/37, 110

(56) References Cited

U.S. PATENT DOCUMENTS

| | | | |
|---|---|---|---|
| 3,680,359 A | * 8/1972 | Lynch | 73/23.21 |
| 3,855,503 A | * 12/1974 | Sistuccia | 361/37 |
| 4,240,372 A | * 12/1980 | Davis | 116/271 |
| 4,494,566 A | * 1/1985 | Sinclair et al. | 137/556 |
| 4,823,224 A | * 4/1989 | Hagerman et al. | 361/37 |
| 4,831,957 A | * 5/1989 | Goans | 116/272 |
| 5,078,078 A | 1/1992 | Cuk | |
| 5,623,891 A | 4/1997 | Miller | |
| 5,859,590 A | * 1/1999 | Otani | 340/635 |
| 5,946,171 A | * 8/1999 | Magnier | 361/37 |

* cited by examiner

Primary Examiner—N. Le
Assistant Examiner—T. R. Sundaram
(74) Attorney, Agent, or Firm—Oyen Wiggs Green & Mutala

(57) ABSTRACT

An internal fault indicator for an electrical device is triggered by a sudden increase in pressure as occurs when an insulation failure creates an electric arc. The heat released in the arc is transferred onto the surrounding volume causing localized overheating, vaporization and decomposition of the insulating material. The resulting pressure surge moves a diaphragm. The movement of the diaphragm releases a spring driven plunger from a barrel which extends through the housing of the electrical device. Prior to activation the plunger is held in an "armed" position by a retaining pin. Upon triggering, the plunger is pushed by the spring until it protrudes from the housing to provide a visual signal of the internal fault. A pressure relief valve may be integrated with the internal fault indicator.

26 Claims, 9 Drawing Sheets

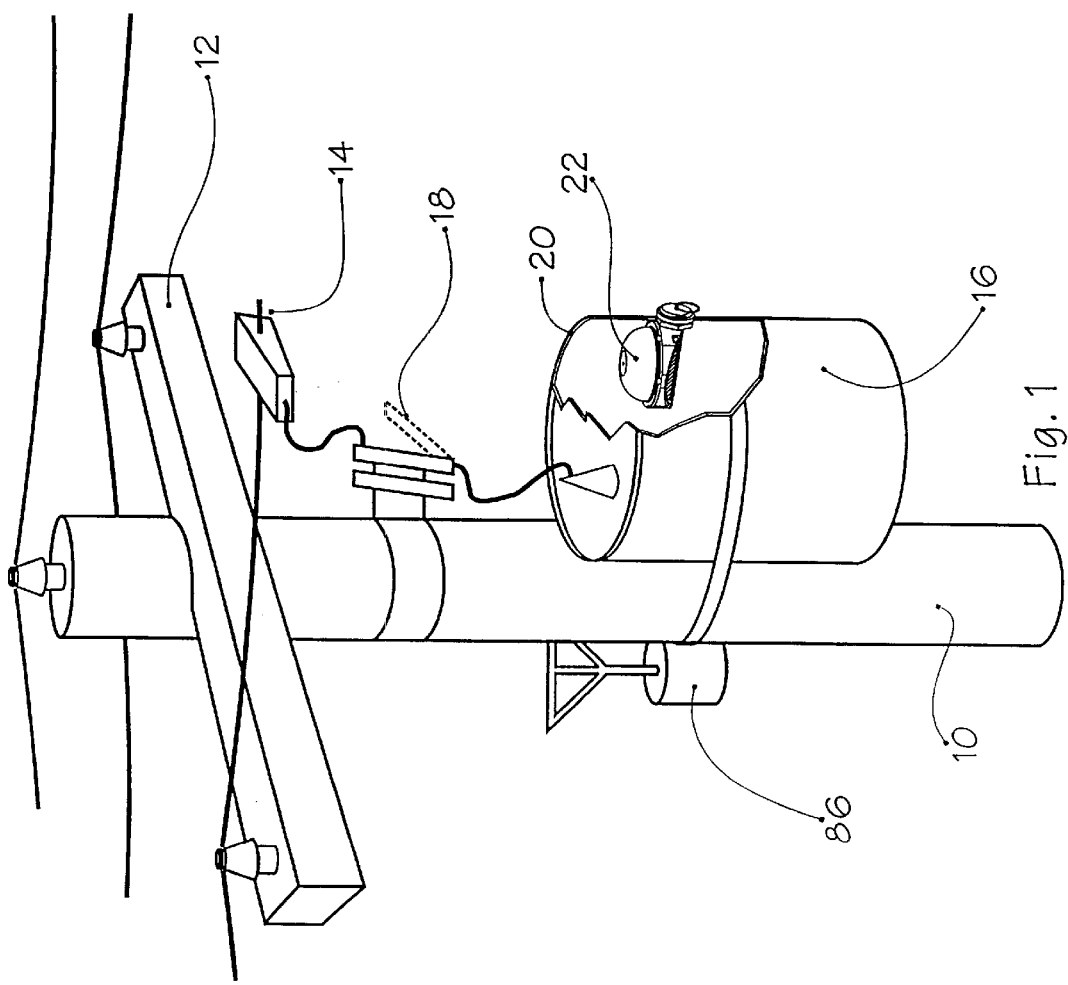

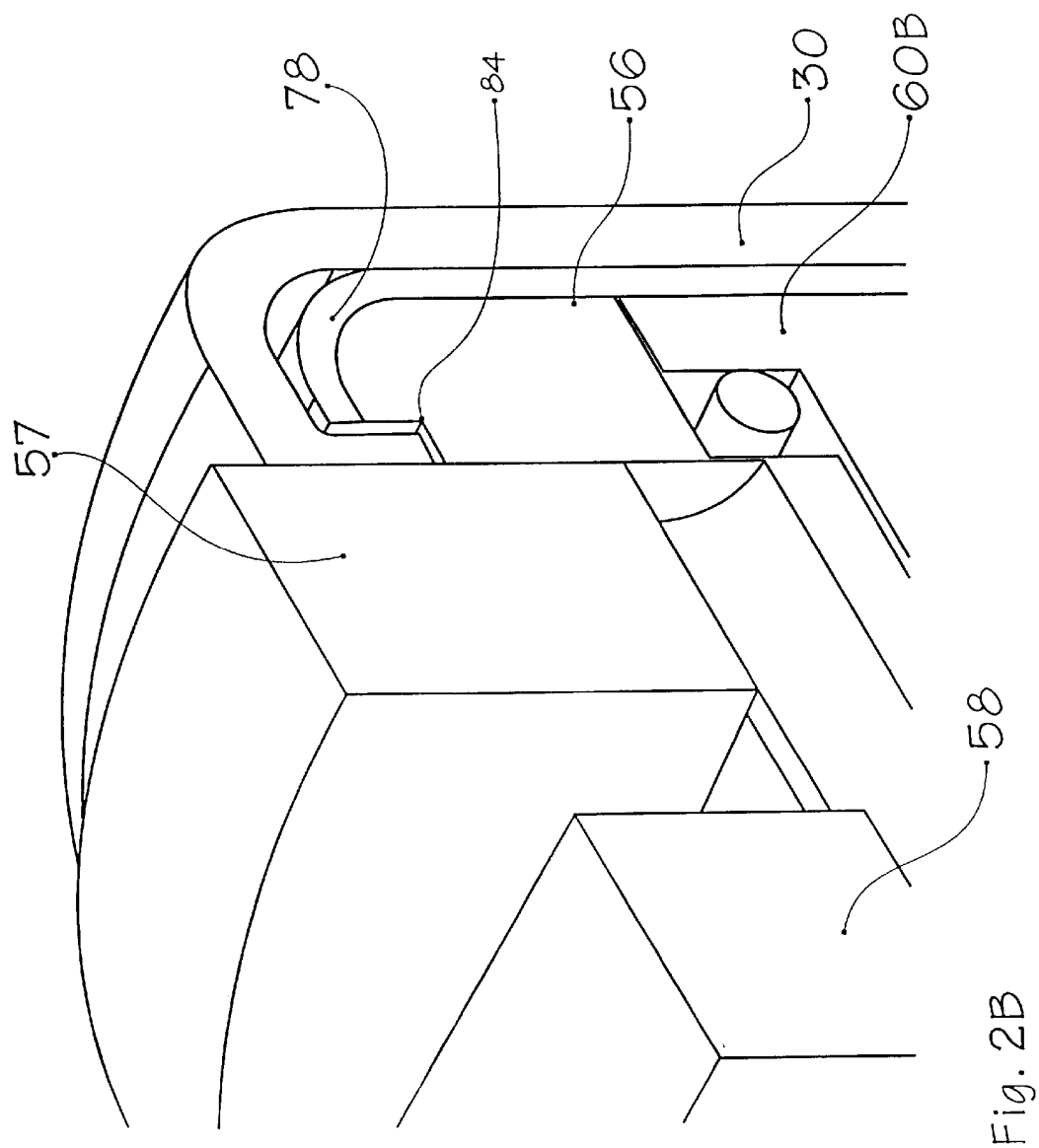

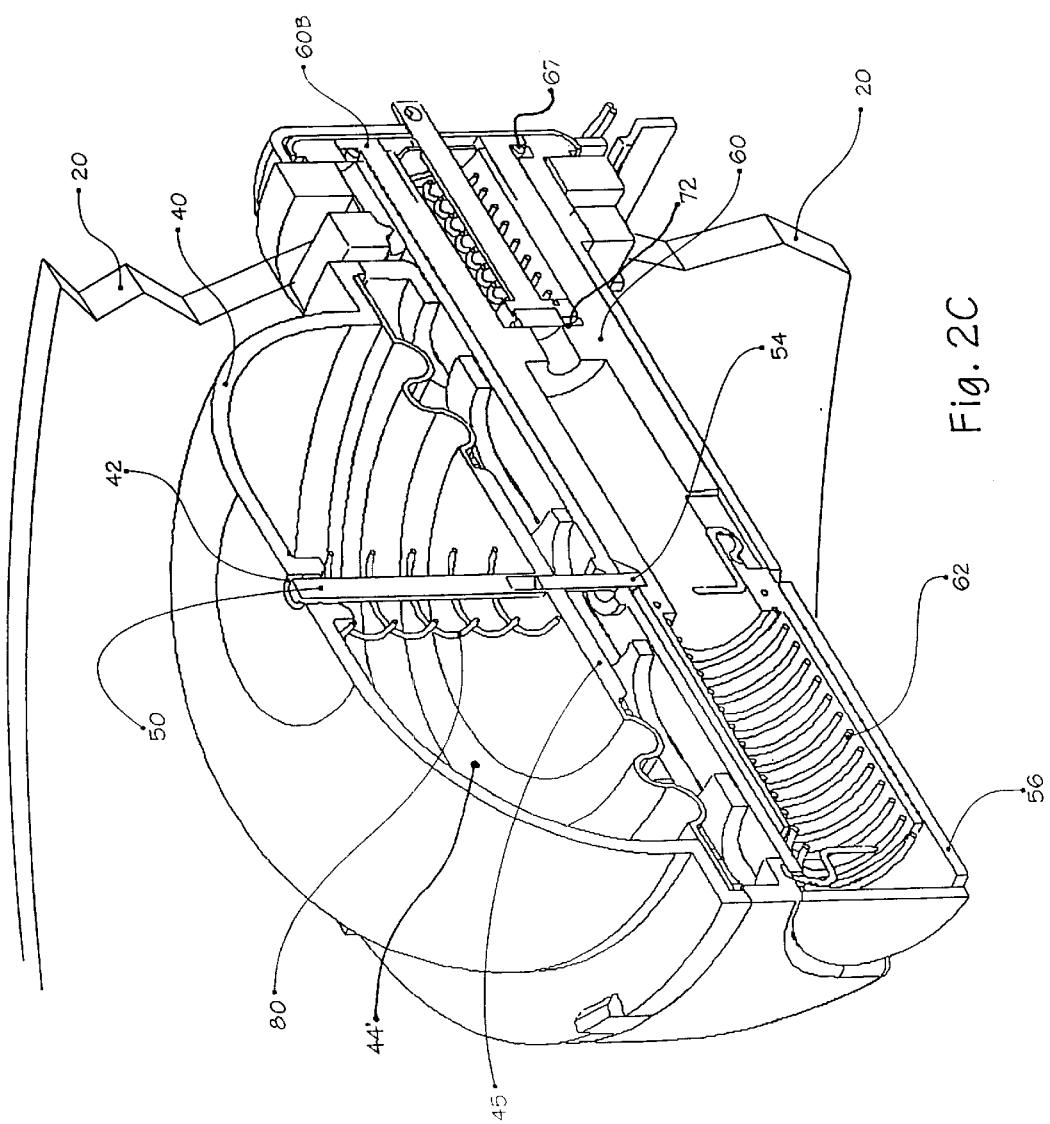

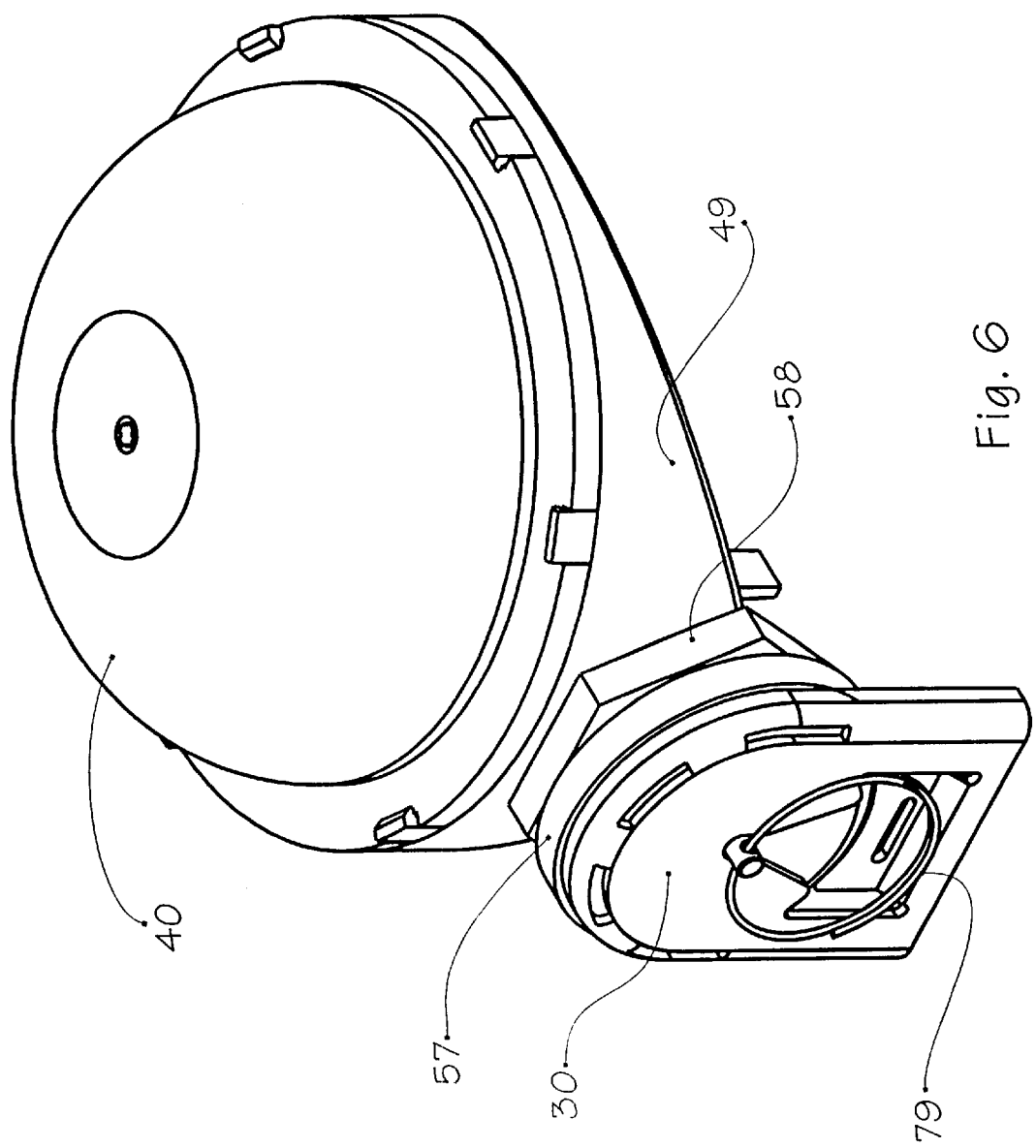

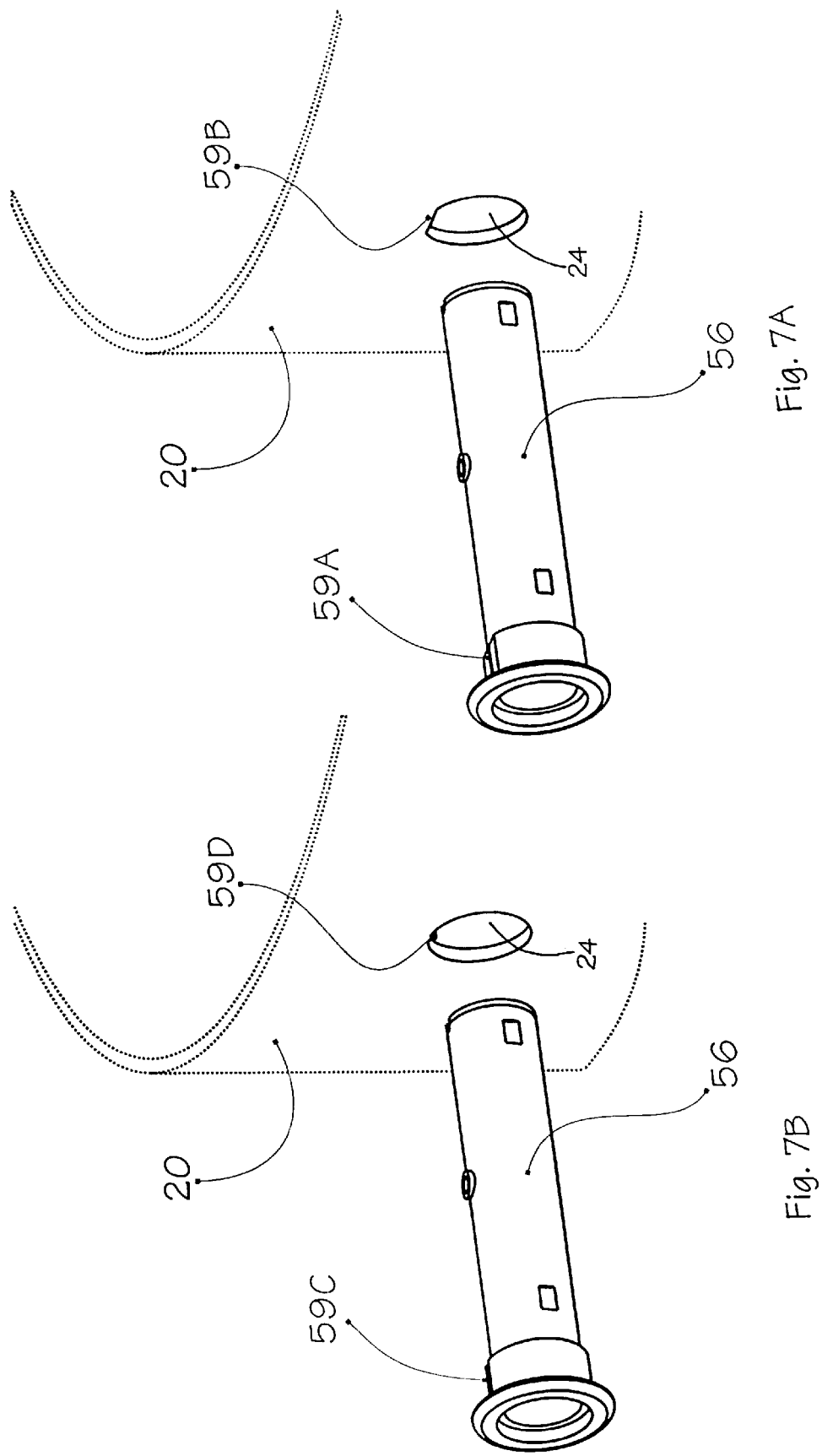

INTERNAL FAULT INDICATOR FOR POWER ELECTRICAL DEVICES

TECHNICAL FIELD

This invention relates to indicators for signalling the occurrence of internal faults in oil-filled or gas-filled electrical equipment, such as transformers, reactors, capacitors and the like. The invention has particular application to electrical components used in electrical power distribution systems. In particular, the invention relates to internal fault indicators which display a visible indicator when an abnormally fast increase in pressure is detected within the housing of an electrical device.

BACKGROUND

Electrical power distribution grids use electrical components, such as transformers, capacitors, and reactors. Potentially dangerous conditions can be created in such devices when aging or operating stresses cause the insulation system to fail. A short circuit within such a device can release a large amount of energy within a fraction of a second. In the worst case the device can explode due to rapid internal pressure buildup from the vaporization of insulating oil and the decomposition of the oil vapor into combustible or volatile gases.

Nearly all pole mounted distribution transformers are protected by a cutout which includes an expulsion fuse or some other fast acting protective device. Such cutouts can minimize damage by disconnecting a faulty device from its source of electric energy so as to interrupt arc current in the event of an overload or internal fault. Service personnel can also use cutouts as manual switches for energizing or disconnecting particular circuits. If there is an overload in the system and the cutout operates, then service personnel can easily spot the open cutout and know that the transformer disconnected by the open cutout is out of service. If the fault is downstream of the transformer then, once that fault has been corrected, it is a simple matter for service personnel to re-fuse the cutout to re-energize the circuit.

If the fault is in the transformer then closing the cutout before the transformer has been repaired will likely produce arcing within the transformer. A device that has failed once is certain to fail again if it is re-energized before the internal damage caused by the arcing has been corrected. Arcing can leave carbonized paths within the device and may impair the mechanical integrity of the device's housing, or "tank". This increases the risk that the device will fail catastrophically if it is re-energized. In extreme cases the transformer may explode. This could cause property damage and serious injury to service personnel and any members of the public who happen to be close by. To avoid this possibility service personnel must perform careful inspections and take special precautionary measures before attempting to re-energize any electrical apparatus found disconnected from the power system by its protective device.

Unfortunately, an internal fault can occur in a device without leaving any obvious visible cues that the fault has occurred in that device. Unless service personnel can tell that a particular device has failed they may reapply power to the device without detecting that the electrical device has failed. This may cause catastrophic failure of the electrical device, as noted above.

It is known that there is a transient surge in pressure inside oil-filled electrical devices, such as transformers, when the devices suffer from an internal arcing fault. This happens because arcing produces a marked increase in temperature which vaporizes some of the oil. Some electrical devices are filled with electrically insulating gases such as $SF_6$. In such gas-filled devices arcing causes pressure surges in the gas.

There exist fault detectors capable of providing a visual indication that a device has failed. Such fault detectors accelerate the restoration of services while minimizing the possibility that a failed device will be re energized as a result of a human error. U.S. Pat. No. 5,078,078, invented by Cuk, who is also the inventor of this invention, describes a device for detecting transient surges in pressure within the housing of a transformer or similar device. The device fits in an opening in a casing of the transformer. A moveable piston senses rapid pressure surges which result from internal arcing faults within the transformer. The piston has at least one aperture in it so that slow increases and decreases of pressure within the transformer do not cause significant motion of the piston. An indicator attached to the piston changes appearance when the piston has moved a predetermined distance and retains the indication until reset. A disadvantage of the Cuk device is that the change in appearance of the indicator may not be readily apparent, especially from a distance. Furthermore, there is no easy way to prevent false triggering during transport and installation.

U.S. Pat. No. 5,623,891 discloses another device for detecting transient surges in pressure within the housing of a transformer. The device has a diaphragm which is subjected to internal pressure surges within the transformer. The diaphragm carries a trigger retainer which engages a trigger on an indicator shaft mounted for rotation within the housing. An indicator is mounted on the indicator shaft beneath a lens which is visible from the outside of the housing. A bias spring biases the indicator shaft toward rotation relative to the housing when the trigger is engaged with the trigger retainer. When the diaphragm moves in response to a pressure surge in the transformer, the trigger retainer moves away to release the trigger, and the bias spring rotates the indicator shaft and indicator so that a warning section on the indicator is positioned for viewing through the lens.

The device disclosed in U.S. Pat. No. 5,623,891 has a number of disadvantages including:

The inner surface of the indicator lens can become fouled by fumes generated during an internal fault;

The outer surface of the indicator lens can be obscured by ice or snow;

The device provides no way to prevent false triggering during transport and installation;

It is typically necessary to mount the device o n the top surface of a transformer, in a position where the lens is not readily visible from the ground;

The device may be falsely triggered by oil splashing or the like; and,

If the device is to be mounted on the side of a transformer housing then there must be a larger than usual air space in the transformer housing or the diaphragm will be partially submerged.

There is a need for internal fault indicators for electrical equipment of the type used in electrical power distribution which provides a clear visual indication that a device has experienced a fault and which avoids some of the disadvantages of the prior art.

SUMMARY OF THE INVENTION

This invention provides a warning indicator for oil-filled electrical equipment, such as power transformers or the like. The warning indicator detects pressure surges created in the housing of the electrical device by an internal electrical fault and yet is insensitive to pressure changes due to normal temperature variations. The indication may be used to positively identify an electrical device which has suffered from an internal fault so that service personnel will be warned not to undergo potentially hazardous attempts to re-energize a faulty piece of electrical equipment.

Accordingly, one aspect of the invention provides a fault indicator for indicating the occurrence of a rapid pressure surge within a housing of an electrical device. The fault indicator comprises: a barrel capable of being mounted in an opening in a housing of an electrical device; and an actuating mechanism. The actuating mechanism comprises: a chamber within the housing, the chamber having at least one orifice communicating between interior and exterior surfaces of the chamber; and, an actuating member movable in responses to a pressure differential between the interior and exterior surfaces of the chamber. The fault indicator also has a plunger within a bore of the barrel. The plunger is biassed outwardly in the barrel and is normally retained in an armed position by the actuating member. When the pressure differential is positive, the actuating member is moved and thereby permits the plunger to move outwardly in the bore to a triggered position.

Preferably the chamber comprises a diaphragm and the actuating member is attached to the diaphragm. The actuating member preferably comprises a trigger pin which projects from the diaphragm and engages a trigger notch in the plunger when the plunger is in its armed position. The diaphragm and the barrel are both preferably oriented generally horizontally. This makes the fault indicator compact.

Another aspect of the invention provides a fault indicator for indicating the occurrence of a rapid pressure surge within a housing of an electrical device. The fault indicator comprises: pressure surge detecting means for moving an actuating member in response to a rapid rise in pressure within a housing of an electrical device; indicator means actuated by the pressure surge detecting means, the indicator means comprising a plunger movably disposed within a bore, the plunger movable outwardly in the bore from an armed position to a triggered position upon movement of the actuating member; and, retaining means for preventing the plunger from becoming separated from the fault indicator.

A still further aspect of the invention provides a method for indicating the occurrence of a rapid pressure surge within a housing of an electrical device. The method comprises: providing a chamber within a housing of an electrical device, the chamber comprising an enclosed volume and an orifice communicating between the enclosed volume and an air space within the housing and providing a plunger having a hidden portion which is hidden from view; allowing a rapid pressure surge within the housing to displace a wall portion of the chamber inwardly; in response to motion of the wall portion releasing a plunger; and, moving the plunger so that the portion of the plunger which was hidden from view is exposed.

Further features and advantages of the invention are described below.

BRIEF DESCRIPTION OF THE DRAWINGS

In figures which illustrate non-limiting embodiments of the invention:

FIG. 1 is a partially cut away view of an electrical power transformer equipped with an internal fault indicator according to the invention and connected to an energy supply;

FIG. 2B is a detailed sectional view of a portion of the internal fault indicator of FIG. 2A with a shipping lock in place to prevent premature triggering of the internal fault indicator;

FIG. 2C is a section through an internal fault indicator according to an alternative embodiment of the invention wherein a coil spring is used to provide a bias force on a trigger pin;

FIG. 6 is a perspective view of the internal fault indicator with its shipping lock in place; and, FIG. 7A is a schematic view showing one possible arrangement for preventing the rotation of a barrel of an internal fault indicator according to the invention in an aperture in a housing of an electrical device; and, FIG. 7B is a schematic view showing another possible arrangement for preventing the rotation of a barrel of an internal fault indicator according to the invention in an aperture in a housing of an electrical device.

Figure 2A:
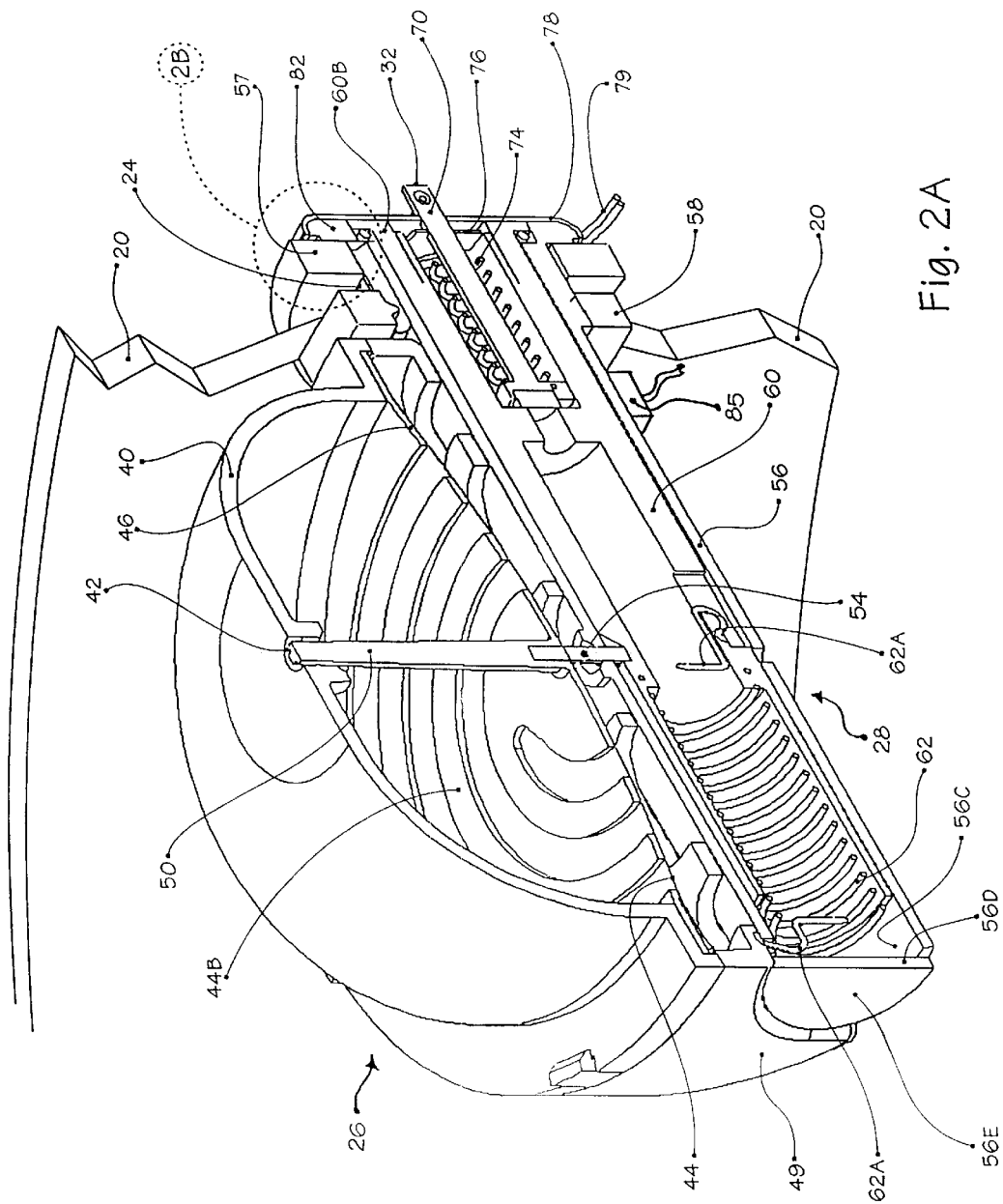
FIG. 2A is a section through an internal fault indicator according to the invention.

| List of Reference Numerals | | | |
|---|---|---|---|
| 10 | pole | 12 | crossarm |
| 14 | power lines | 16 | transformer |
| 18 | fused cutout | 20 | housing |
| 22 | internal fault indicator | 24 | aperture |
| 26 | actuator mechanism | 28 | indicator mechanism |
| 30 | shipping lock | 32 | pressure relief valve |
| 40 | chamber | 42 | orifice |
| 44 | diaphragm | 44A | face of diaphragm in chamber |
| 44B | face of diaphragm in housing | 44' | gas barrier (FIG. 2C) |
| 45 | stiffener (FIG. 2C) | 46 | compliant substructure |
| 48 | spiral spring | 49 | splash cover |
| 50 | rod | 54 | trigger pin |
| 56 | barrel | 56A | outer end of barrel |
| 56B | threaded shoulder | 56C | bore of barrel |
| 561 | flange | 56E | inner end of barrel |
| 57 | gasket | 58 | nut |
| 59A | flat | 59B | flat |
| 59C | notch | 59D | projection |
| 60 | plunger | 60A | inner end of plunger |
| 60B | outer end of plunger | 60C | side of plunger |
| 60D | cylindrical extension | 62 | eject spring |
| 62A | tails of eject spring | 64 | trigger notch |
| 65 | guide opening | 67 | sealing ring |
| 68 | chamber/splashguard assembly | 69 | groove |
| 69A | edges of groove | 70 | valve member |
| 72 | valve seat | 74 | pressure relief valve spring |
| 76 | spring retainer | 78 | vent cap |
| 80 | spring (FIG. 2C) | 79 | ring |
| 82 | flange | 84 | shipping lock holding groove |
| 85 | control signal generator | 86 | transmitter |

DESCRIPTION

The invention will now be described using the example of an internal fault indicator for a power transformer. It will be appreciated that the invention has application to high power electrical devices generally and not just to transformers. FIG. 1 shows a typical distribution pole 10 with a crossarm 12 supporting power lines 14. A transformer 16 is mounted on the pole 10 and is connected via a fused cutout 18 to one of the lines 14. When the cutout opens, it hinges down as illustrated in dashed outline in FIG. 1. This breaks the circuit between transformer 16 and line 14.

Transformer 16 has a housing or "tank" 20. An internal fault indicator 22 (which could also be called an internal fault detector) is mounted in an aperture 24 (best shown in FIG. 7A) in a side wall of housing 20. Aperture 24 is preferably a small hole. Aperture 24 may, for example, be a hole about 1 inch (25.4 mm) in diameter. Housing 20 contains electrically insulating oil (or gas). Internal fault indicator 22 is located in an air space above the level of oil in housing 20.

As shown in FIG. 2A, internal fault indicator 22 comprises an actuator mechanism, indicated generally by 26, which detects transient pressure surges within housing 20, and an indicator mechanism, indicated generally by 28, which changes appearance when the actuator mechanism has detected a transient pressure surge. Preferably internal fault indicator 22. also comprises a shipping lock 30 which, when installed, prevents indicator mechanism 28 from being triggered. Internal fault indicator 22 can also conveniently include an integral pressure relief valve 32. Shipping lock 30 may prevent pressure relief valve 32 from being actuated.

When there is a breakdown of the insulation surrounding the energized or "active" components of transformer 16 an electric arc is created. The electric arc dissipates large amounts of energy. The sudden dissipation of energy within housing 20 causes a sharp rise in the pressure within housing 20. Even at levels of short circuit current on the order of 100 amperes, or less, the pressure within housing 20 rises at a rate which is distinctly higher then any other pressure rises that are reasonably expected to occur in normal operation of transformer 16. This rapid pressure rise is detected by actuator mechanism 26 which triggers indicator mechanism 28.

If the pressure rises to a value which is greater than the set point of pressure relief valve 32 then pressure relief valve 32 opens until the pressure has been relieved. The pressure within housing 20 may rise to a level capable of opening pressure relief valve 32 as a result of normal fluctuations in ambient temperature and loading. Service personnel may also manually operate pressure relief valve 32, as described below, to equalize the ambient pressure inside housing 20 with the air pressure outside of housing 20.

Figure 3:
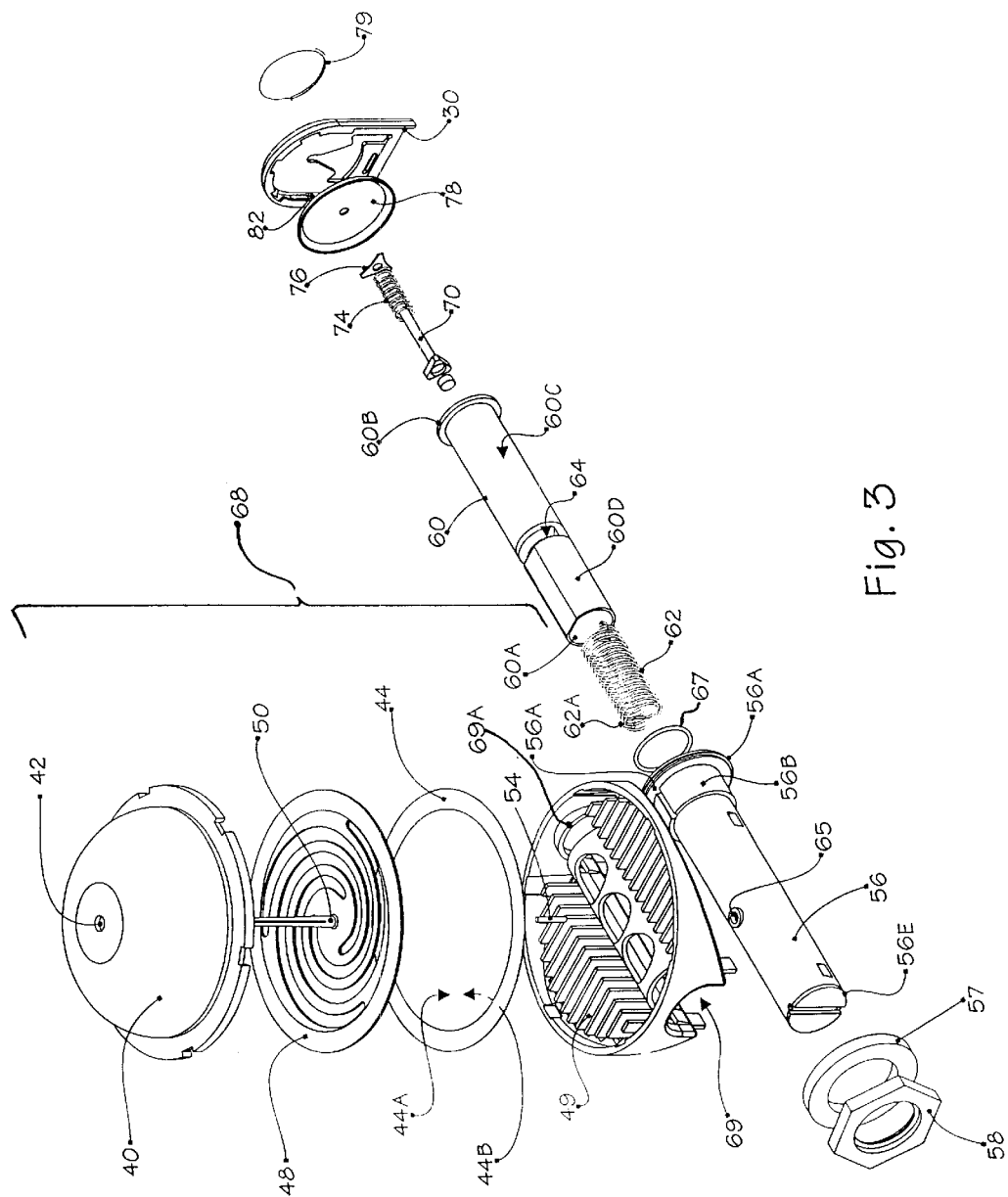
FIG. 3 is an exploded view of the internal fault indicator of FIG. 2.
Figure 4:
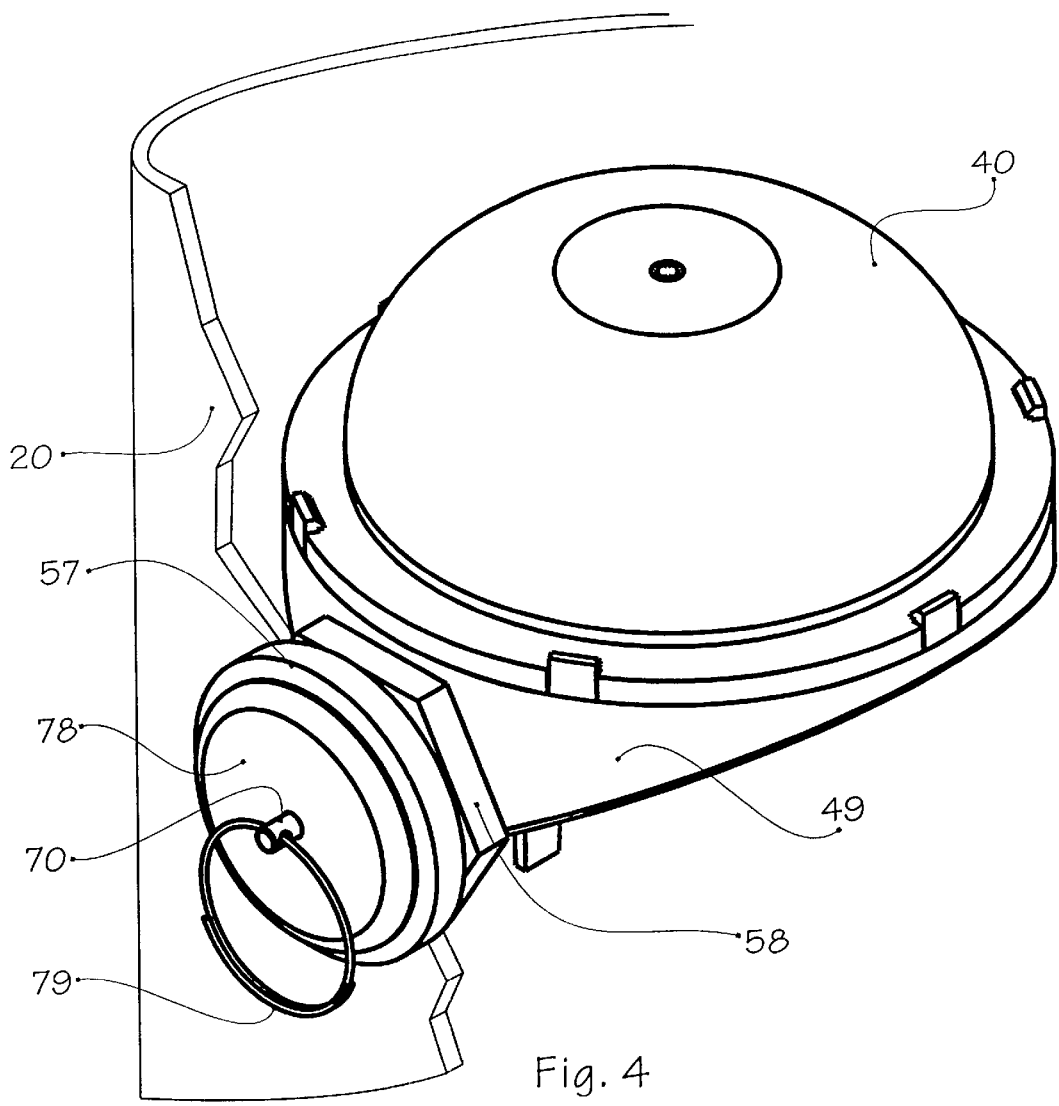
FIG. 4 is a perspective view of the internal fault indicator of FIG. 2 before activation.

As shown best in FIGS. 2A and 3, actuator mechanism 26 comprises a chamber 40 which is open to the interior of housing 20 only by way of a small orifice 42. A thin diaphragm 44, which functions as a gas barrier, supported by a compliant substructure 46 forms one wall of chamber 40. In the illustrated embodiment the compliant substructure comprises a spiral spring 48. Spiral spring 48 is preferably configured to lie on a spherical surface when it is at equilibrium. Diaphragm 44 has one face 44A in chamber 40 and a second face 44B exposed to the ambient pressure within housing 20. Chamber 40 is preferably roughly semispherical so that it can occupy a reasonably small space within housing 20. Diaphragm 44 preferably has a reasonably large area so that pressure differentials across diaphragm 44 will generate sufficient forces to trigger indicator mechanism 28. Diaphragm 44 may, for example, have a diameter of 3 inches or more. For maximum reliability and sensitivity, diaphragm 44 should face downward toward the surface of the oil in housing 20.

Because air can enter or leave chamber 40 by way of orifice 42, the air pressure within chamber 40 will track slow changes in the ambient pressure within housing 20. Such changes might occur, for example, when the temperature of transformer 16 changes. On the other hand, if the pressure within housing 20 increases very suddenly, the air pressure within chamber 40 will take some time to increase because of the small size of orifice 42. Preferably diaphragm 44 moves far enough to reliably trigger indicator mechanism 28 in response to pressure surges which are more rapid than about 0.5 to 1.5 psi over 5 ms and diaphragm 44 is insensitive to fluctuations in the ambient pressure within housing 20 which occur more slowly than about 1 psi per second. During this period the pressure on face 44B of diaphragm 44 will temporarily significantly exceed the pressure on face 44A. Diaphragm 44 is pushed toward chamber 40. This would occur if an electrical fault in the active components of transformer 16 caused an electrical arc within housing 20. A splash cover 49 dampens the effects of oil splashing onto diaphragm 44 as might occur, for example, if housing 20 was shaken by an earthquake.

An axial guide rod 50 extending from spiral spring 48 projects into orifice 42. The location of the end of guide rod 50 projecting through orifice 42 can be used to verify that spiral spring 48 has been properly located within chamber 40 during assembly. The movement of diaphragm 44 triggers indicator mechanism 28. In the illustrated embodiment a trigger pin 54 projects from face 44B of diaphragm 44. Trigger pin 54 may be press fit into a hub located in the central portion of spiral spring 48. Under normal operating conditions chamber 40 is exposed to various mechanical vibrations and shocks including seismic tremors. To avoid false triggering by such mechanical vibrations, and to permit rapid operation, the mass of diaphragm 44 and spiral spring 48 should be small. Diaphragm 44 can comprise a thin layer of an air impermeable material such as 5 mil polyethylene film. Spiral spring 48 may be fabricated from a thin sheet of a suitably resilient plastic.

Indicator mechanism 28 comprises a barrel 56. A flanged outer end 56A of barrel 56 projects through aperture 24. An all weather gasket 57 is captured between outer end 56A and the outer surface of housing 20. A nut 58 threaded onto a threaded shoulder 56B on barrel 56 is tightened against the interior wall surface of housing 20 to ensure the integrity of the seal around aperture 24. Barrel 56 should be prevented from rotating in hole 24. This may be accomplished, for example, by making aperture 24 D-shaped with a flat 59B in aperture 24 which engages a corresponding flat 59A on shoulder 56B (see FIG. 7A). FIG. 7B shows an alternative construction which prevents rotation of barrel 56 relative to aperture 24. In the embodiment of FIG. 7B, a projection 59D on housing 20 engages a notch 59C in shoulder 56B.

Preferably barrel 56 is small enough to fit into an aperture which is approximately 1 inch in diameter. Barrel 56 is made of non-conductive material so that barrel 56 does not provide a conductive path through the wall of housing 20. Barrel 56 may, for example, be fabricated from fiber-reinforced polypropylene with additives to provide resistance to degradation by the action of sunlight.

A plunger 60 is located within a bore 56C of barrel 56. Plunger 60 is urged outwardly by an eject spring 62 which is compressed between plunger 60 and an inwardly projecting flange 56D at an inner end 56E of barrel 56. Preferably eject spring 62 is received within a cylindrical extension 60D of plunger 60. Eject spring 62 is preferably attached both to barrel 56 and to plunger 60. This may be accomplished by providing tails 62A on either end of eject spring 62. Tails 62A positively interlock with mating features on plunger 60 and barrel 56.

Until internal fault indicator 22 is triggered, plunger 60 is prevented from being ejected from barrel 56 by the engagement of trigger pin 54 in a trigger notch 64 in plunger 60. Trigger pin 54 passes into bore 56C through a chamfered guide opening 65. Spiral spring 48 provides a slight spring force which tends to seat trigger pin 54 in trigger notch 64. Plunger 60 preferably has a flanged outer end 60B which bears against a sealing ring 67 near the outer end of bore 56C. This seals opening 24 while plunger 60 remains in its armed position within bore 56C.

Figure 5:
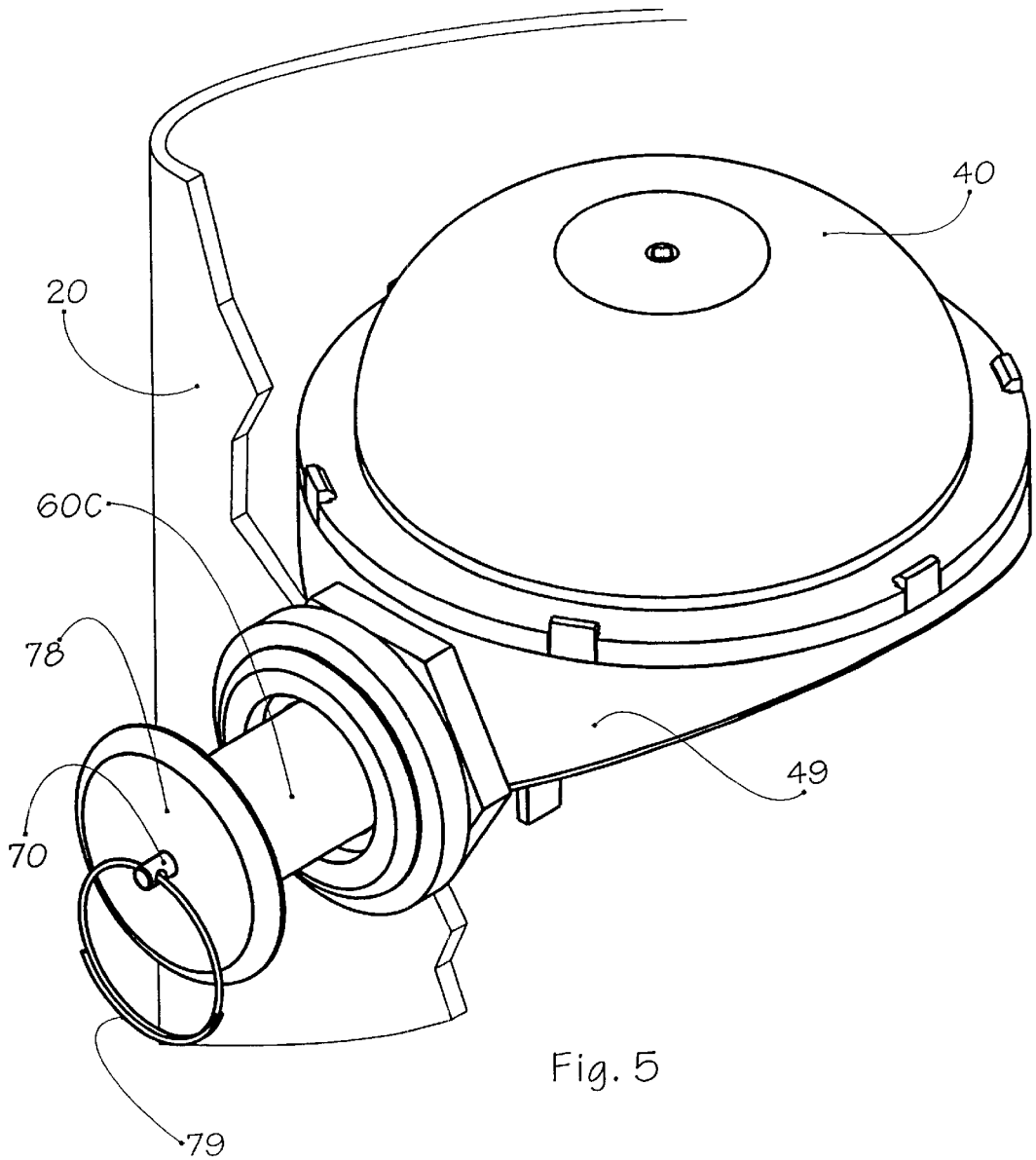
FIG. 5 is a perspective view of the internal fault indicator of FIG. 2 after activation.

The side surface 60C of plunger 60 is brightly colored, and preferably has a color which has high contrast to the colors typically found in the environment of a transformer 16. Preferred colors are blaze orange, and bright yellow. It can be appreciated from the foregoing description that, upon a rapid pressure rise within housing 20, diaphragm 44 is displaced away from barrel 56. This pulls trigger pin 54 out of trigger notch 64. Eject spring 62 then pushes plunger 60 out of bore 56C of barrel 56. Plunger 60 is pushed at least far enough outward in bore 56C that a rear end of plunger 60 is past the location of trigger pin 54 and side surface 60C, which was previously hidden from view within bore 56C is revealed, as shown in FIG. 5.

Preferably, after plunger 60 has been pushed outward in bore 56C, the outer end of plunger 60 extends significantly beyond the outer opening of barrel 56. This provides a highly visible indication that a fault has occurred in transformer 16. The shape of internal fault indicator 22 is changed after plunger 60 has been ejected. Furthermore, after plunger 60 has been ejected its brightly colored outer surface 60C is exposed to view.

Shortly after plunger 60 has been pushed outward in barrel 56 the pressure in chamber 40 will equalize with the ambient pressure within housing 20. This causes diaphragm 44 to resume its normal position. When diaphragm 44 has resumed its normal position, trigger pin 54 projects into bore 56C. Trigger pin 54 thereby blocks plunger 60 from being pushed back into bore 56C. This prevents transformer 16 from being put unknowingly back into service without having passed an internal inspection. In general, whenever an electrical device has malfunctioned in a way that has triggered internal fault indicator 22, the device should be opened and inspected before it is put back into service.

As best seen in FIG. 3, the illustrated embodiment of internal fault indicator 22 can be assembled by first affixing barrel 56 in aperture 24 as described above and then chamber 40 can be attached to barrel 56. In the illustrated embodiment a combined chamber splashguard assembly 68 has a groove 69 on its lower surface for receiving barrel 56. The outer edges 69A of groove 69 are resilient and can be snapped over the outer surface of barrel 56. When barrel 56 is received in groove 69, groove 69 engages and grips barrel 56. With chamber/splashguard assembly 68 installed on barrel 56 (as shown in FIG. 2A) trigger pin 54 passes into guide opening 65 on barrel 56.

Pressure relief valve 32 may be made integral with plunger 60. The pressure relief valve comprises an axially movable valve member 70 which is biased into engagement with a valve seat 72 by a low rate spring 74. If the ambient pressure within housing 20 exceeds the atmospheric pressure outside of housing 20 then there is a net outward force on the end of valve member 70. When the this force exceeds a predetermined value, for example, a force corresponding to a pressure differential of 5 psi, spring 74 will compress and allow gases to vent from housing 20. Valve member 70 protrudes through a spring retainer 76 to a vent cap 78. As valve member 70 moves axially outwardly, gases can escape from housing 20 by way of a venting gap between vent cap 78 and the outer end 60B of plunger 60. A ring or other graspable member 79 may be attached at the outer end of valve member 70 to permit manual venting of housing 20. Combining an internal fault indicator and a pressure relief valve in a single device avoids the need to provide two apertures in housing 20 and conserves space within housing 20.

The outer end 56A of barrel 56 can receive a shipping lock 30. FIG. 6 shows a fault indicator 22 with a shipping lock 30 installed. Shipping lock 30 attaches to outer end 56A of barrel 56 and blocks plunger 60 from moving outward in bore 56C. Shipping lock 30 can be kept in place until after transformer 16 has been installed. After transformer 16 has been installed, and before transformer 16 has been put into service, shipping lock 30 is removed.

In the illustrated embodiment, shipping lock 30 comprises a member having a pair of inwardly directed flanges 82 which engage grooves 84 (best seen in FIG. 2B) on outer end 56A of barrel 56. In the illustrated embodiment grooves 84 are defined between a stepped flange on the end 56A of barrel 56 and the outer surface of housing 20. Preferably lock 30 must be broken to remove it from the end of barrel 56.

Internal fault indicator 22 optionally includes a facility 85 for generating a control signal when the internal fault indicator is triggered. This facility may comprise one or more sets of electrical contacts which close or open when internal fault indicator 22 is triggered. The electrical contacts may be operated to generate the control signal, for example, by the passage of plunger 60 in bore 56C, or by the motion of trigger pin 54. The electrical contacts may be in a first position (either closed or open) when plunger 60 is in its armed position. As fault indicator 22 is triggered the electrical contacts are switched so that when plunger 60 is in its triggered position the contacts are in a second position (either open or closed). Facility 85 may comprise other mechanisms such as fiber optics for communicating a control signal indicating to transmitter 86 that internal fault indicator 22 has been triggered. A transmitter 86 generates a fault signal such as a radio signal in response to the control signal.

It can be appreciated that the internal fault indicator depicted in the accompanying figures has a number of advantages over prior art fault indicators. The ability to provide a single device which functions both as a pressure relief valve and as an internal fault indicator provides significant advantages over prior devices. It simplifies the construction of housings for electrical devices since a single opening in the housing can service both a fault indicator and a pressure relief valve. It also provides more latitude in arranging parts within the electrical device housing. Space is at a premium inside the housing of a typical electrical device. This is especially the case in the top portion of the electrical device. A pressure relief valve and an internal fault indicator should both be in the air space at the top of the housing. In typical electrical devices power leads also enter the housing through the upper air space region.

Providing a plunger 60 which is expelled from bore 56C when fault indicator 22 is triggered results in a visual indication that a fault has occurred in a device which can be seen much more clearly and unambiguously than has been previously possible. Both the apparent "shape" and color of the fault indicator change upon actuation. Further, because the fault indicator can be mounted in a side wall of a housing 20, it can display its indication in a location which is more readily visible from the ground than previous fault indicators which are mountable only in the top surface of a housing.

The construction of internal fault indicator 22 which includes a sensor diaphragm and an indicator element wherein, upon actuation, the indicator element moves in a direction generally parallel to a plane of the diaphragm provides a compact internal fault indicator 22 which can be mounted in the air space at the top of housing 20 and yet has a large enough diaphragm area to provide good sensitivity to pressure surges inside housing 20.

Providing an indicator element which cannot be returned to its initial position after internal fault indicator 22 has been triggered without opening housing 20 reduces the likelihood that, through human error, an electrical device will be placed back into use before it has been properly inspected and serviced.

A diaphragm assembly which includes a spiral spring, for example, the spiral spring 48 shown in the Figures, has the advantage that it is self-centering and allows easy axial movement of trigger pin 54.

Internal fault indicator 22 can be made so that it projects from housing 20 by only a minimal amount. Thus there are no surfaces to which snow and ice are likely to adhere.

Where internal fault indicator 22 will be used in electrical apparatus, the fault indicator should be designed and constructed to provide longevity, and high reliability under all expected operating conditions. Further, the components of internal fault indicator 22 should, as much as possible be made from non-conductive materials so as to interfere as little as possible with the distribution of electric fields in the device. As will be apparent to those skilled in the art in the light of the foregoing disclosure, many alterations and modifications are possible in the practice of this invention without departing from the spirit or scope thereof. For example:

the single orifice 42 shown in the drawings could be replaced with a number of smaller orifices or some other construction which limits the rate at which the pressure within chamber 40 can follow fluctuations in the ambient pressure within housing 20;

the shape of orifice 42 may be annular, as illustrated on FIG. 2 or some other shape;

compliant substructure 46 is preferably a spiral spring but is not necessarily a spiral spring;

compliant substructure 46 could be integral with diaphragm 44;

in the illustrated embodiment trigger pin 54 prevents plunger 60 from being reinserted into bore 56C after internal fault indicator 22 has been triggered. A separate pawl or other one-way ratchet mechanism could be provided so that internal fault indicator 22 can be reset only from inside housing 20;

While it is desirable that ejection spring 62 be attached to both plunger 60 and barrel 56 a separate retainer cord could be provided to prevent plunger 60 from falling completely away from internal fault indicator 22 upon actuation. Ejection spring or a retainer cord constitute "retaining means" which function to prevent plunger 60 from becoming separated from fault indicator 22 by being attached to both plunger 60 and transformer 16;

various mechanical linkages may be used to release plunger 60 in response to motion of diaphragm 44;

Instead of using diaphragm 44 or a compliant support member, such as a spiral spring 48 to bias pin 54 toward plunger 60, a separate bias means, such as a spring 80 could be used to bias diaphragm 44 toward plunger 60 as shown in FIG. 2C. In FIG. 2C, a thin gas barrier 44' is supported by a lightweight stiffener plate 45 from which pin 54 projects. A coil spring 80 urges pin 54 into engagement with plunger 60.

In place of a chamber 40 closed on one side by a flexible diaphragm, actuator mechanism 26 could comprise:

A chamber closed by both a relatively high mass piston and a relatively low mass piston. The two pistons may be concentric with one another and are connected to springs having the same spring constant. The inertia of the large mass piston prevents the large mass piston from moving in response to sudden pressure surges. The large mass piston and the small mass piston can both move in response to slow pressure fluctuations. Relative motion of the large mass and small mass pistons can be used to release indicator mechanism 28;

Chamber 40 may comprise the interior of a bellows having rigid end faces joined by a flexible cylindrical wall. Relative motion of the rigid end faces can trigger indicator mechanism 28 by way of a suitable mechanical linkage. One or more openings in the bellows will prevent the end faces from moving in response to slow fluctuations in the ambient pressure within housing 20;

In non-preferred embodiments of the invention, diaphragm 44 could be replaced with a rigid or semi-rigid movable piston which is displaced toward chamber 40 in response to sudden pressure surges within housing 20;

a chamber 40 closed on one side by a diaphragm, as described above, for example, or any of these alternative mechanisms constitute "pressure surge detecting means" which respond to surges in pressure within housing 20 by moving a portion of a wall of a cavity with a force sufficient to operate an indicator mechanism 28;

plunger 60 may have a different shape from the shape described above, for example, plunger 60 could comprise a flag, rod, plate, or the like having hidden portions which are hidden from view within bore 56C when plunger 60 is in its armed position and are revealed when plunger 60 moves to a triggered position. A plunger 60 as described above, and any of the alternatives described herein for displaying an indication that internal fault detector has detected a fault, constitute "indicator means";

The locking device could attach to housing 20 or device 22 in a manner different from that illustrated herein. The locking device could be a different kind of member which prevents plunger 60 from accidentally moving to its triggered position before internal fault indicator 22 is put into service. For example, the locking device could comprise a pin (not shown) which passes through an aperture in plunger 60 and therefore prevents plunger 60 from moving longitudinally in barrel 56 until the pin is removed. The locking device could also comprise, for example, a sliding or pivoting or break-away member at the outer end of plunger 60 which blocks plunger 60 from moving outwardly in barrel 56.

Ejector spring 62 could comprise an extension spring arranged to pull plunger 60 outward in bore 56C in place of the illustrated compression spring.

Accordingly, the scope of the invention is to be construed in accordance with the substance defined by the following claims.

What is claimed is:

1. A fault indicator for indicating the occurrence of a rapid pressure surge within a housing of an electrical device, the fault indicator comprising:
   a) a barrel capable of being mounted in an opening in a housing of an electrical device;
   b) an actuating mechanism comprising:
      i) a chamber within the housing, the chamber having at least one orifice communicating between interior and exterior surfaces of the chamber; and,
      ii) an actuating member movable in response to a pressure differential between the interior and exterior surfaces of the chamber; and,
   c) a plunger within a bore of the barrel, the plunger biased outwardly in the barrel and normally retained in an armed position by the actuating member;
   wherein, when the pressure differential exceeds a positive threshold value, the actuating member is moved sufficiently to permit the plunger to move outwardly in the bore to a triggered position.

2. The fault indicator of claim 1 wherein the chamber comprises a diaphragm and the actuating member is attached to the diaphragm.

3. The fault indicator of claim 2 wherein the actuating member comprises a trigger pin projecting from the diaphragm, the trigger pin engaging a trigger notch in the plunger when the plunger is in its ready position.

4. The fault indicator of claim 3 wherein the diaphragm and the barrel are both oriented generally horizontally.

5. The fault indicator of claim 4 wherein the diaphragm has a first face facing the chamber and a second downward facing face and the fault indicator comprises an apertured splash guard covering the second face of the diaphragm.

6. The fault indicator of claim 4 comprising a spring urging the plunger outwardly in the bore.

7. The fault indicator of claim 6 wherein the spring extends into a cylindrical opening on an inner end of the plunger and wherein, upon triggering the spring can push the plunger to a position wherein a rear end of the plunger is outward in the bore from trigger pin.

8. The fault indicator of claim 6 wherein an exterior surface of the plunger is brightly colored.

9. The fault indicator of claim 1 comprising a spring urging the plunger outwardly in the bore.

10. The fault indicator of claim 9 wherein the spring is attached to both the plunger and the barrel.

11. The fault indicator of claim 1 comprising a pressure relief valve within the plunger.

12. The fault indicator of claim 2 comprising a compliant substructure supporting the diaphragm.

13. The fault indicator of claim 12 wherein the compliant substructure comprises a spiral spring.

14. The fault indicator of claim 2 wherein the diaphragm comprises a thin sheet of a gas barrier material and the fault indicator comprises a comprising a spring urging actuating member into engagement with the plunger.

15. The fault indicator of claim 12 comprising a guide pin projecting in an axial direction from a central portion of the compliant substructure, the guide pin projecting at least part way into the orifice.

16. The fault indicator of claim 1 comprising a removable lock on an outer end of the barrel, the lock blocking outward motion of the plunger in the bore.

17. The fault indicator of claim 16 wherein the lock comprises a member which is broken upon removing the lock from the outer end of the bore.

18. The fault indicator of claim 1 wherein an outer end of the plunger comprises a flange, the flange sealingly engaging a seal member on the barrel when the plunger is in its armed position.

19. The fault indicator of claim 1 comprising a one-way mechanism in the bore which prevents the plunger from being pushed from the triggered position back to the armed position.

20. The fault indicator of claim 1 comprising a signal transmitter connected to broadcast a fault signal upon actuation of the fault indicator.

21. The fault indicator of claim 1 comprising a set of electrical contacts, the electrical contacts being closed or open when the plunger is in its armed position and the electrical contacts switching to open or closed when the plunger is in its triggered position.

22. An electrical device having a closed housing, a fault indicator according to claim 1 with the chamber in the housing and the barrel projecting through an aperture in the housing and one or more active electrical components within the housing.

23. The electrical device of claim 22 wherein the aperture is in a side wall of the housing.

24. A fault indicator for indicating the occurrence of a rapid pressure surge within a housing of an electrical device, the fault indicator comprising:
   a) pressure surge detecting means for moving an actuating member in response to a rapid rise in pressure within a housing of an electrical device;
   b) indicator means actuated by the pressure surge detecting means, the indicator means comprising a plunger movably disposed within a bore, the plunger movable outwardly in the bore from an armed position to a triggered position upon movement of the actuating member; and,
   c) retaining means for preventing the plunger from becoming separated from the fault indicator.

25. A method for indicating the occurrence of a rapid pressure surge within a housing of an electrical device, the method comprising:
   a) providing a chamber within a housing of an electrical device, the chamber comprising an enclosed volume and an orifice communicating between the enclosed volume and an air space within the housing and providing a plunger having a hidden portion which is hidden from view;
   b) allowing a rapid pressure surge within the housing to displace a wall portion of the chamber inwardly;
   c) in response to motion of the wall portion releasing a plunger; and,
   d) moving the plunger so that the portion of the plunger which was hidden from view is exposed.

26. The method of claim 25 wherein moving the plunger comprises pushing the plunger out of a bore in the housing wherein the hidden portion of the plunger is a side face of the plunger.

* * * * *